United States Patent
Voigt et al.

(10) Patent No.: US 10,574,708 B2
(45) Date of Patent: Feb. 25, 2020

(54) METHOD AND SYSTEM FOR REMOTE COMMUNICATION

(71) Applicant: Bose Corporation, Framingham, MA (US)

(72) Inventors: William Voigt, Southborough, MA (US); Darren Abrams, Stow, MA (US); Pelham Norville, Wayland, MA (US); Noah Stupak, Arlington, MA (US); William Rice, Wayland, MA (US); John Trotter, Sudbury, MA (US)

(73) Assignee: Bose Corporation, Framingham, MA (US)

( * ) Notice: Subject to any disclaimer, the term of this patent is extended or adjusted under 35 U.S.C. 154(b) by 176 days.

(21) Appl. No.: 15/674,073

(22) Filed: Aug. 10, 2017

(65) Prior Publication Data
US 2019/0052680 A1  Feb. 14, 2019

(51) Int. Cl.
*H04L 29/08* (2006.01)
*H04L 29/06* (2006.01)

(52) U.S. Cl.
CPC ...... *H04L 65/1069* (2013.01); *H04L 65/1059* (2013.01); *H04L 67/24* (2013.01)

(58) Field of Classification Search
CPC .. H04L 65/1069; H04L 65/1059; H04L 67/24
USPC ......................................................... 709/227
See application file for complete search history.

(56) References Cited

U.S. PATENT DOCUMENTS

| 8,726,366 | B2 | 5/2014 | Levien et al. | |
|---|---|---|---|---|
| 9,285,886 | B2 | 3/2016 | Reilly et al. | |
| 9,294,869 | B2 | 3/2016 | Pang et al. | |
| 2007/0156812 | A1 | 7/2007 | Hou et al. | |
| 2008/0242231 | A1* | 10/2008 | Gray | H04M 1/72563 455/66.1 |
| 2015/0172878 | A1* | 6/2015 | Luna | H04W 4/12 455/412.2 |
| 2017/0078305 | A1* | 3/2017 | Murrells | H04L 63/107 |

FOREIGN PATENT DOCUMENTS

EP           1773040           4/2007

* cited by examiner

*Primary Examiner* — Glenford J Madamba
(74) *Attorney, Agent, or Firm* — Bond, Schoeneck & King, PLLC

(57) ABSTRACT

A system configured for remote communication includes a sensor configured to detect a presence of a first individual, a processor configured to determine an intent of the first individual to establish communication with a remote individual, a communication module configured to communicate the presence and intent to a remote system and further configured to receive an indication of the presence and availability of a second individual at the remote system to communication, and an indicator configured to indicate the second individual's presence and availability to communication. The indicator is configured to indicate a plurality of different presence and availability states for the second individual.

25 Claims, 3 Drawing Sheets

METHOD AND SYSTEM FOR REMOTE COMMUNICATION

BACKGROUND

The disclosure relates to communication between devices along a continuum of possible connection options.

SUMMARY

All examples and features mentioned below can be combined in any technically possible way.

In one aspect, a device configured for remote communication includes: (i) a sensor configured to detect a presence of a first individual; (ii) a processor configured to determine an intent of the first individual to establish audio and/or video communication with a remote individual; (iii) a communication module configured to communicate, to a remote device, the detected presence and determined intent of the first individual, and further configured to receive, from the remote device, an indication of a presence of the second individual at the remote device, and further configured to receive availability of the second individual to audio and/or video communication; and (iv) an indicator configured to indicate, at the first device, the detection of the second individual's presence and availability to audio and/or video communication, where the indicator is configured to indicate a plurality of different presence and availability states for the second individual.

Embodiments may include one of the following features, or any combination thereof. The sensor may be configured to detect the proximity of the first individual to the sensor, and the communication module may be configured to communicate the detected proximity. The sensor may be configured to detect an identity of the first individual, and the communication module may be configured to communicate the detected identity. The sensor may be a microphone, a biometric sensor, a camera, a wearable device, a motion detector, or a wireless signal sensor, among other types of sensors. The sensor may be configured to obtain sound information upon detection of the presence of the first individual, where the sound information is utilized to communicate the detected presence and/or determined intent of the first individual to the remote device. The processor may be configured to analyze the sound information to remove unwanted sound.

Embodiments may include one of the following features, or any combination thereof. The indicator may be or comprise a speaker or visual display. The indicator may be configured to indicate each of the plurality of different presence and availability states for the second individual differently. The indicator may be configured to communicate sound from the remote device as the indication of the detection of the second individual's presence. The device may further include a video display.

Embodiments may include one of the following features, or any combination thereof. The device may be configured to automatically establish, in response to the detection of the second individual's presence, an audio and/or video communication link with the remote device. The device may be configured to automatically establish, in response to the detection of the second individual's availability to audio and/or video communication, an audio and/or video communication link with the remote device. The device may be configured to automatically establish, in response to the detection of the first individual's identity, an audio and/or video communication link with the remote device. The device may be configured to automatically establish, in response to certain sound information, an audio and/or video communication link with the remote device.

In another aspect, a system for remote communication includes a first communication device including: a sensor configured to detect a presence of a first individual; a processor configured to determine an intent of the first individual to establish audio and/or video communication with a remote individual; a communication module configured to communicate the detected presence and determined intent of the first individual, and further configured to receive an indication of a presence of a second individual and availability of the second individual to audio and/or video communication; and an indicator configured to indicate the detection of the second individual's presence and availability to audio and/or video communication, where the indicator is configured to indicate a plurality of different presence and availability states for the second individual. The system includes a second communication device in communication with the first communication device, the second communication device including: a sensor configured to detect a presence of the second individual; a processor configured to determine availability of the first individual to establish audio and/or video communication with a remote individual; a communication module configured receive an indication of a presence of the first individual and intent of the first individual for audio and/or video communication, and further configured to communicate the detected presence and determined availability of the second individual; and an indicator configured to indicate the detection of the first individual's presence and intent for audio and/or video communication, wherein the indicator is configured to indicate a plurality of different presence and availability states for the first individual.

Embodiments may include one of the following features, or any combination thereof. The first and/or second indicators can be configured to indicate each of the plurality of different presence, intent, and/or availability states for the second individual differently.

In another aspect, a method for remote communication includes detecting a presence of a first individual with a sensor of a first system, determining an intent of the first individual to establish audio and/or video communication with a remote individual, communicating the detected presence and determined intent of the first individual to a remote system, receiving from a remote system an indication of a presence of a second individual at the remote system and availability of the second individual to audio and/or video communication, and providing by an indicator of the first system the detection of the second individual's presence and availability to audio and/or video communication, where the indicator is configured to indicate a plurality of different presence and availability states for the second individual.

Embodiments may include one of the following features, or any combination thereof. The sensor may be configured to detect an identity of the first individual. The sensor may be configured to obtain sound information upon detection of the presence of the first individual, and the sound information may be utilized to communicate the detected presence and/or determined intent of the first individual to the remote system. The indicator may be configured to indicate each of the plurality of different presence and availability states for the second individual differently.

DETAILED DESCRIPTION

Remote communication tools do not support the full continuum of connectedness normally available to individuals located within the same space. In contrast to the full range of communication options available to individuals in the same space, individuals using a communication system have only the binary options of being connected via audio and/or video for a conversation, or being disconnected. There is a need for a communication system with a full range of communication options rather than a single binary option.

Figure 1:
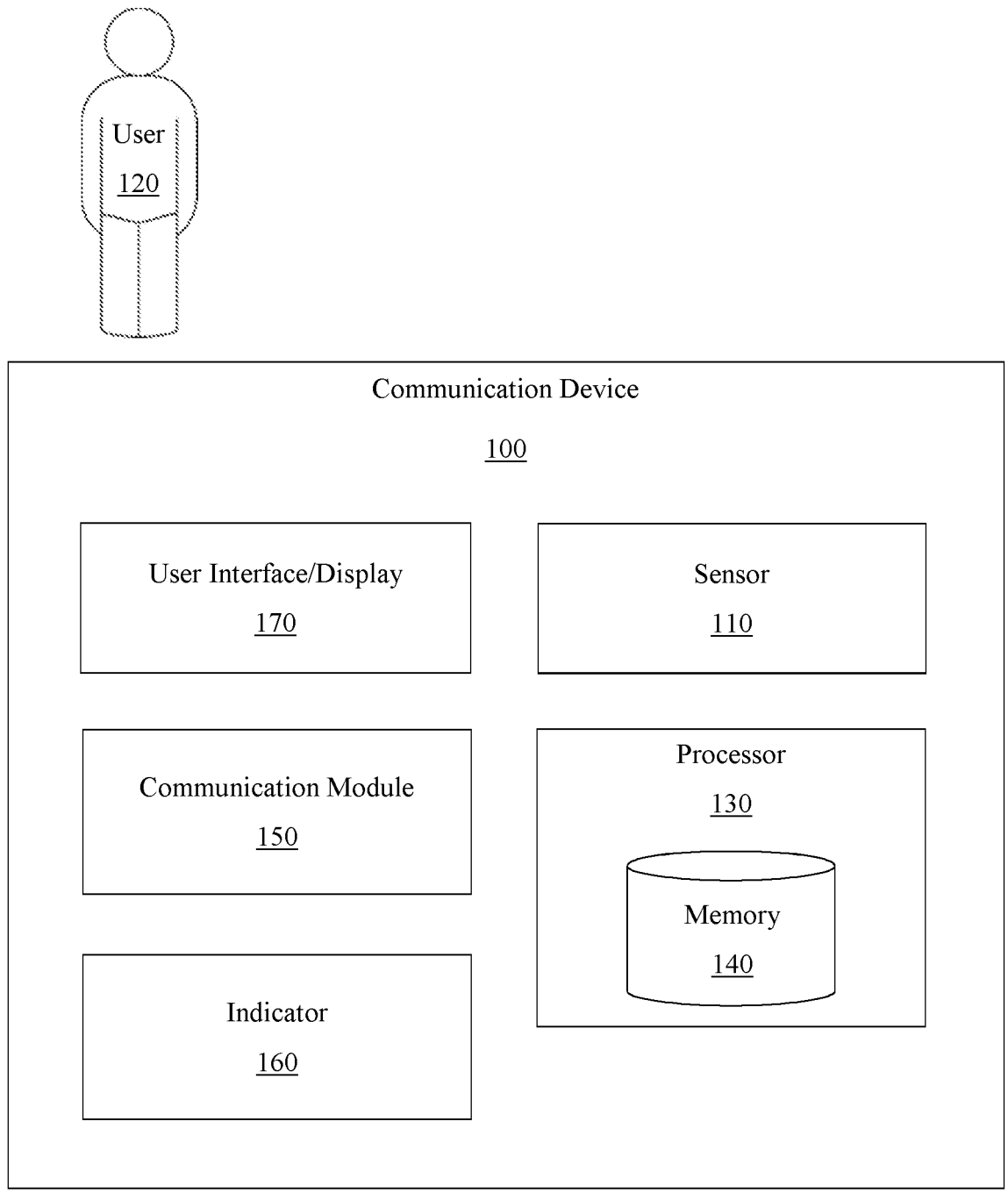
FIG. 1 is a block diagram illustrating an example of a communication device.

FIG. 1 is a schematic representation of a communication system or device 100. The communication device can comprise any of the elements, modules, and/or other components described or otherwise envisioned herein. Although shown in FIG. 1 as a singular device, it should be recognized that one or more components or elements of device 100 may be located remotely from, but in communication with, any other component or element of the device.

According to an embodiment, communication device 100 comprises a sensor 110. Sensor 110 is configured to obtain information about an individual 120 within sensor range of the sensor. The sensor may be any sensor configured to obtain information about the individual. For example, the sensor may be a microphone, a biometric sensor, a camera, a wearable device, a motion detector, radar, and/or a wireless signal sensor, among many other types of sensors.

According to an embodiment, sensor 110 of communication device 100 detects the presence of individual 120 within sensor range of the sensor. For example, the sensor may determine that the individual is within sensor range by detecting noise made by the individual, by obtaining an image of the individual with a camera, by detecting a biometric signal of the individual, or by detecting the proximity of the individual using a motion detector, radar, and/or a wireless signal sensor. As another example, the sensor may determine that the individual is within sensor range by detecting the presence of a signal from a wearable device, fob, computing device, or other system or device associated with the presence of the individual. According to an embodiment, the sensor is configured to determine not only the presence of the individual, but an exact or approximate proximity of the individual to the sensor based on the received sensor data. For example, the sensor may determine that the individual is within a certain radius or proximity based on the intensity of noise, the strength of a received proximity signal, and/or based on other sensor data.

Communication device 100 further comprises a processor 130. Processor 130 may be formed of one or several elements modules and may comprise one processor or multiple processors. The processor may comprise a memory 140 which may be any type of memory and which may permanently and/or temporarily store an operating system, user settings, learned data or behavior, and other data. Such an operating system may comprise code which is executable by the processor and may control one or more components of device 100.

Processor 130 receives sensor information from sensor 110 and is configured or programmed to analyze the sensor information to detect the presence of the first individual 120 within a certain proximity to the sensor, the communication device, or another component of the communication system. The processor is further configured or programmed to analyze the sensor information to determine an exact or approximate proximity of the individual to the sensor based on the received sensor data.

According to an embodiment, processor 130 is further configured to determine the identity of the individual 120. The processor may utilize information from sensor 110 and/or one or more additional sensors to determine the identity of the individual. For example, the sensor may obtain an image of the individual and the processor may analyze the image using facial-recognition technology or other recognition technology to determine the identity. As another example, the processor 130 may receive biometric data from the sensor 110 and compare the biometric data to a database or memory of stored biometric data to make the identification. As another example, the processor 130 may receive data from a fob, smartphone, computing device, or any other device, signal emitter, or other component associated with a specific individual, and may compare that data to a database or memory of stored data to make the identification.

The processor may utilize one or more other informational sources to determine, estimate, or predict the identity of individual 120. For example, the processor may be programmed to recognize that only one individual can activate communication device 100, or the processor may have access to an individual or household calendar which provides an indication of which individual(s) is likely to be present near the device, among many other options.

According to an embodiment, processor 130 is configured to determine, predict, or infer the intent of the individual 120 to establish audio and/or video communication with a remote individual using communication device 100. The intent of the individual 120 to communication is the individual's desire for audio and/or video communication with another individual via the communication device. For example, the individual may be near the device and may be otherwise unoccupied, but may not intend to establish audio and/or video communication to another individual via the communication device due to one or more factors. The individual may be fatigued after just returning home, or may be planning to leave the vicinity, and thus may not desire communication. The processor may determine, predict, or infer the individual's intent from obtained sensor data and/or from the one or more other informational sources. The device or processor may comprise learned information or one or more system settings that informs the device that the individual does not have the requisite intent, or allows the device to predict or infer that the individual does not have the requisite intent. For example, the system may be programmed such that the individual is not available before 7:00 AM or after 11:00 PM, or that the individual is available or not available at specific times based on a daily or monthly calendar, on holidays, if other people are present, and/or if a specific person is present. If the individual is not available or is occupied, the individual cannot have the intent for communication. As another example, the system may be programmed such that the individual prefers to wait until after 10:00 AM for communication, or prefers to avoid communication during meal times, after returning home after work, if a certain television show is playing in the background, if there is an active conversation in the environment, and/or in other situations. The processor may then determine that although the individual is present near the device, the individual does not have an intention to establish communication due to the user settings or calendar information. Many other methods for determining, predicting, or inferring the individual's intent are possible.

According to an embodiment, processor 130 is further configured to determine, predict, or infer the availability of an individual to establish audio and/or video communication with a remote individual using communication device 100. The availability of an individual to communication is the receptiveness of the individual to audio and/or video communication. For example, the individual may be near the device and may be receptive to communication from a remote individual. Alternatively, the individual may be near the device but may not be receptive to communication from a remote individual. The processor may determine, predict, or infer availability from obtained sensor data and/or from the one or more other informational sources. The device or processor may comprise learned information or one or more system settings that informs the device that the individual is not receptive to communication from a remote individual. For example, the system may be programmed such that the individual is or is not receptive to communication at certain times or days, or based on environmental signals. As another example, the individual may be occupied or the setting may be too busy or loud for communication. An individual engaged in a conversation near the communication device may not be receptive to communication from a remote individual. The intensity or tone of the individual's voice may indicate that the individual is or is not receptive to communication from a remote individual. A television, radio, or other device active in the background may indicate that the individual is not receptive to communication from a remote individual. Many other cues or information about the individual's receptivity to communication are possible.

Communication device 100 further comprises a communication module 150. The communication module is configured to transmit information via a wired and/or wireless link to a communication network. The transmitted information may include the detected presence and determined intent of an individual 120 for communication. The information may also include the determined identity of the individual. As just one example, the communication module may be a WiFi, Bluetooth, or other wireless signal transmitter configured to transmit a signal comprising the information to a wireless transceiver located within the environment. The wireless transceiver receives the signal and transmits the information to a remote location via a wired and/or wireless communications network such as the internet, an intranet, or any other type of network.

Communication module 150 is further configured to receive, from a remote communication device or system, an indication of the presence of a second individual at that remote system, as well as the availability of the second individual to audio and/or video communication with the first individual.

According to an embodiment, the processor and/or communication module is configured to automatically request or establish an audio and/or video communication link in response to detection of an individual's presence, identity, proximity to a communication device, availability, and/or intent.

Communication device 100 further comprises an indicator 160. The indicator is configured to indicate detection of an individual's presence at a communication device or system. The indicator is further configured to indicate an individual's availability and/or intent to audio and/or video communication. The indicator is configured to provide a plurality of different presence, identity, availability, and/or intent states for an individual. For example, the indicator may provide one indication among many possible indications along a continuum or spectrum of possible indicators.

Indicator 160 may be or comprise any indication sufficient to communicate the indicating information to an individual. For example, indicator 160 may be a speaker, a visual display, a vibrating mechanism, a color display, or any other type of indicator. As one example, indicator 160 may be a speaker that emits a noise or plays sounds communicated from a connected remote communication device. As another example, indicator 160 may be a LED or other light display that emits light of varying colors and/or intensity to indicate different states along a continuum or spectrum of possible states. A light display 160 of communication device 100 can be configured to emit a light of a first color to indicate the presence of an individual at a remote communication device, and can either increase the intensity of the first light or transform to a second color as the individual at the remote communication device gets closer to the device, and/or as the remote communication device determines that the individual is available for communication. Rather than a binary indication of active communication or no communication, a light display 160 of communication device 100 is configured or programmed to indicate a plurality of presence, availability, and intent states for an individual located at a connected communication device.

According to an embodiment, indicator 160 of communication device 100 comprises a plurality of indicators each configured to indicate at least one of an individual's presence, availability, and/or intent. For example, a first indicator 160*a* can be configured to indicate an individual's presence near a communication device, and a second indicator 160*b* can be configured to indicate the individual's availability and/or intent for video and/or audio communication. First indicator 160*a* and second indicator 160*b* may comprise the same indication method, or may comprise different indication methods. For example, first indicator 160*a* may utilize noise to convey presence, and second indicator 160*b* may utilize light to convey intent or availability.

Communication device 100 optionally comprises a display 170. The display is configured to display information on a screen or a surface. Accordingly, display 170 may comprise a screen or similar display, or may comprise a projector or other means to project information. As with the other components of the communication device, display 170 can be an element of a single device or may be a separate component in communication with one or more of the other components of the communication device. For example, display 170 can be a display in the environment such as a television, computer screen, wearable device display, or other display. Display 170 can display any displayable information generated by or received by the communication device 100. For example, display 170 may be utilized for face-to-face communication between two or more communication devices, to display a video or other information generated by or received by communication device 100, or for any other use.

Figure 2:
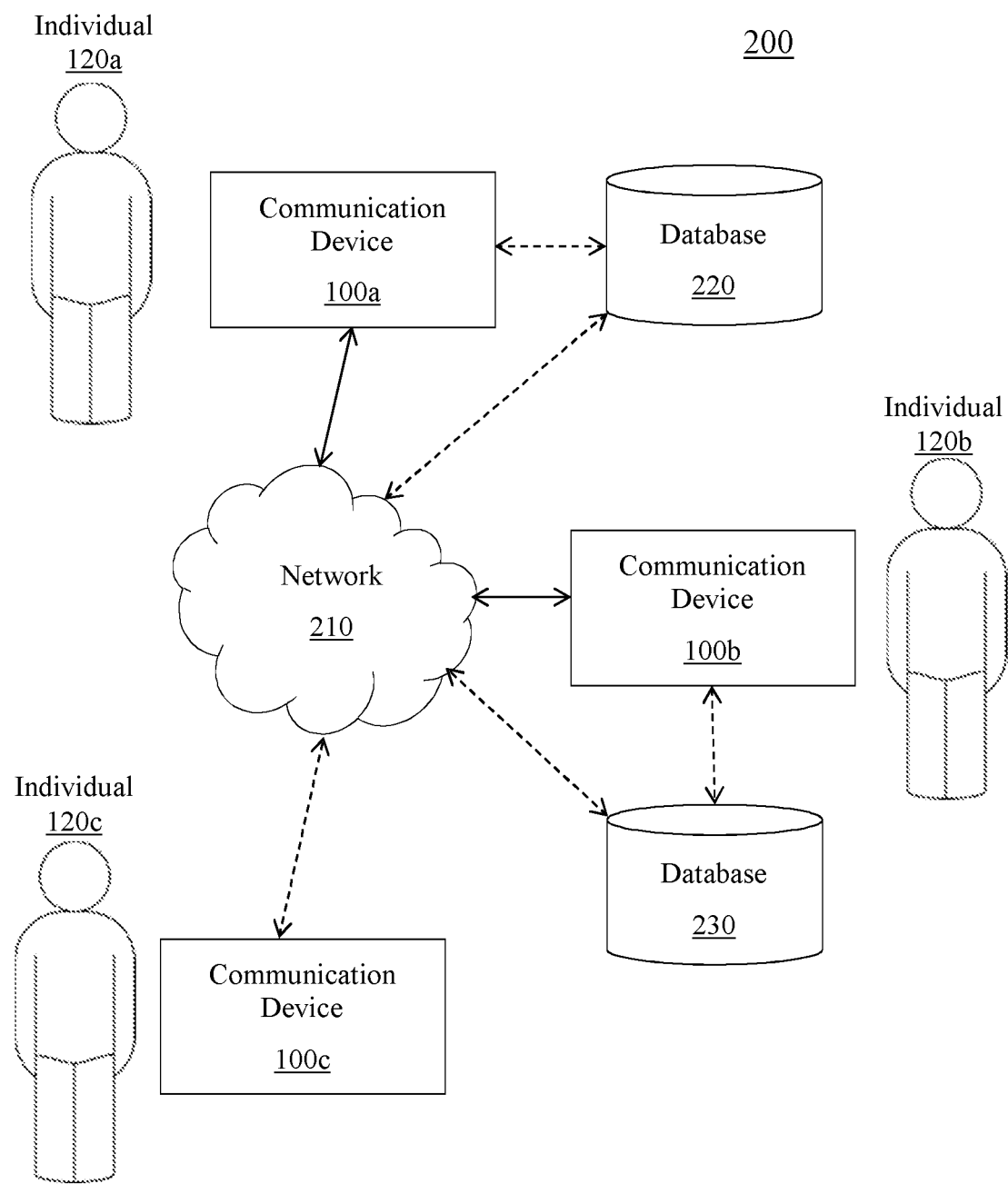
FIG. 2 is a block diagram illustrating an example of a communication system.

FIG. 2 is a schematic representation of a communication system 200. The communication system can comprise any of the elements, modules, and/or other components described or otherwise envisioned herein. The communication system comprises at least first communication device 100*a*, a second communication device 100*b*, and a communication network 210. According to an embodiment, the communication system comprises one or more additional communication devices such as device 100*c* with individual 120*c*.

The communication devices 100 are any of the devices described or otherwise envisioned herein.

Network 210 is any network configured to transmit information from one location to another location, and may be a wired and/or wireless communication network. The network may be an intranet that connects communication devices within a building, facility, campus, or other connected location, or may be an intranet or other communications network that connects remote communication devices. For example, two or more communicating devices may be located in different rooms of the same house, in different apartments of the same building, in different cities, in different continents, or any other two locations. Additionally, a communication device can be located in a setting or environment other than a room, such as a car cabin, in headphones, a handheld computing device, a wearable device, or in any other suitable location or device.

According to an embodiment, as individual 120a enters the vicinity of communication device 100a, a sensor of communication device 100a obtains sensor data and the device detects the individual's presence. Communication device 100a may also detect the identity of individual 100a using images or any other method of identification. Communication device 100a determines, from the sensor data or another source of information, the intent of individual 100a to establish audio and/or video communication with a remote individual 120b. According to an embodiment, the communication device may comprise or otherwise be in communication with a database 220 of intent information for individual 120a. The database may comprise a calendar, stored learned information, or stored settings that are utilized to determine individual 120a's intent to establish communication.

Communication device 100a communicates the presence, identity, and/or intent information to communication device 100b via the communication network 210. Communication device 100b conveys the received information to individual 120b via display 170 of the device. For example, communication device 100b may emit ambient sound collected by device 100a or may activate or emit a light to indicate that individual 100a is present. The ambient sound or light may change as individual 100a gets closer to or moves further from communication device 100a. Display 170 of device 100b may also provide an indication of individual 120a's identity or intent.

According to an embodiment, if individual 120b is in the vicinity of communication device 100b, a sensor of communication device 100b obtains sensor data and the device detects the individual's presence. Communication device 100b may also detect the identity of individual 120b using images or any other method of identification. Communication device 100b determines, from the sensor data or another source of information, the availability of individual 120b to audio and/or video communication with a remote individual 120a. According to an embodiment, the communication device may comprise or otherwise be in communication with a database 230 of availability information for individual 120b. The database may comprise a calendar, stored learned information, or stored settings that are utilized to determine availability information for individual 120b.

Communication device 100b communicates the presence, identity, and/or availability information to communication device 100a via the communication network 210. Communication device 100a conveys the received information to individual 120a via display 170 of the device. For example, communication device 100a may emit ambient sound collected by device 100b or may activate or emit a light to indicate that individual 100b is present. The ambient sound or light may change as individual 100b gets closer to or moves further from communication device 100b. Display 170 of device 100a may also provide an indication of individual 120b's identity or availability for communication.

According to an embodiment, one or both of communication devices 100a and 100b establish a communications link to communicate information between the devices and to a respective individual. Receipt of presence and availability or intent information by a communication device can be accepted as tacit permission to establish a greater depth of communication between the devices. For example, if individual 120a is present and is available for communication, and individual 120b is present and is determined to have the availability for communication, each device receives the necessary information and interprets or analyzes the information to enable additional communication. For example, one or more of the devices may now be enabled for direct voice or video communication without requiring any additional activation or permissions from either individual.

However, communication can occur across a continuum or spectrum of communication choices. As a first example, if individual 120a is present but is not available for communication due to, for example, a scheduling conflict or detection of a behavior that the device is programmed to or had learned to recognize as a lack of intent, then communication device 100a either does not send information to device 100b, or sends information indicating that individual 120a does not have the necessary intent for communication. Accordingly, a communication link will not be established. Similarly, if individual 120a is present and is available for communication, and individual 120b is present and is determined not to have the availability for communication, then communication device 100b either does not send information to device 100a, or sends information indicating that individual 120b does not have the necessary availability for communication. Accordingly, a communication link will not be established.

According to another embodiment, low-fidelity communication information may be communicated between devices 100a and 100b. For example, if individual 120a is present and available for communication, and individual 120b is present and has the availability for communication, the communication devices may establish a communications link. Low-fidelity communicated information may be, for example, ambient sounds collected by a device and sent to the other device indicating an individual's presence, without direct person-to-person communication. These ambient sounds may be communicated just as they are collected by sensor 110 of a device, or may be modified prior to communication. For example, the ambient sounds may be distorted such that words cannot be detected, yet the identifying characteristics of voices are communicated, and/or background noises such as movement are communicated. This ambient sound provides a rendered sense of presence of the other individual, even though the other individual is located remotely. This low-fidelity communication may be based on one or more user settings or learned settings. For example, an individual may provide or modify a setting to inform the system that low-fidelity communication such as ambient or background noises is allowed at certain times or are allowed as a default, but that higher-fidelity communication such as direct person-to-person communication or background conversation is allowed at certain times or as a default. Additionally, an individual may switch between low-fidelity communication and high-fidelity communication using a gesture, a button, a command, or any other indication or activation mechanism.

According to another example, low-fidelity information communicated between the devices may be active background information such as a radio show, song, podcast, television show, news, movie, or other active background information to which one or both individuals are viewing or listening. For example, individual 120a may be listening to a podcast, some of which is communicated to individual 120b via the devices and the network if individual 120b is present and has the requisite level of availability to receive that communication. Individual 120b may become interested and decide to play the podcast simultaneously with individual 120a, which may be facilitated in whole or in part by device 100b. The requisite level of availability, therefore, indicates that individual 120b is interested in or receptive to engaging in individual 120a's activity.

According to a similar example, system 200 may determine, prediction, or infer presence, availability, and intent to automatically establish a communications link between device 100a and device 100b. For example, device 100a may detect activity or presence of individual 120a through sound such as a television show in the background, and device 100b may detect activity or presence of individual 120b through similar sound. If individual 120a and 120b are engaging in similar activities such as watching the same television show, then the system may determine, prediction, or infer that the individuals have the requisite availability and intent, and may automatically establish a communications link between device 100a and device 100b.

The inference may be based on a user setting and/or a learned behavior or setting. For example, if individual 120a and 120b often actively establish a communications link when engaging in similar activity, the system may learn that a communications link can be automatically established when the system determines that the individuals are engaging in similar activity. If the individuals then close or reject a communications link that is automatically established, then the system may learn that there were conditions or parameters that resulted in a scenario where a link should not have been established. The inference of presence, identity, availability, and/or intent and the subsequent establishment of a communications link can be learned from many interactions between individual 120 and device 100, and can be ruled by or modified by one or more user settings or direct individual interaction. For example, an individual may hit a snooze button or a silence button to indicate to device 100 that a communication link is not desired, thereby indicating that the individual is not available and/or does not have the availability for a link, even though the individual is present. According to another embodiment, the communication system may determine from environmental cues such as noise, conversation, or biometrics that the individual is not available and/or does not have the intent for a link, even though the individual is present. For example, the individual's heartrate may be significantly elevated as indicated by a wearable device, camera, or microphone, and the system may be programmed or has learned to avoid a communication link when the individual's heartrate is above a certain threshold and/or for a certain amount of time after that heartrate is achieved. According to another example, a level of noise above a certain threshold may indicate that an individual is not available or does not have the requisite intent for communication. According to another example, unidentified voices or individuals in the vicinity of the communication device may indicate that an individual is not available or does not have the requisite intent for communication.

Figure 3:
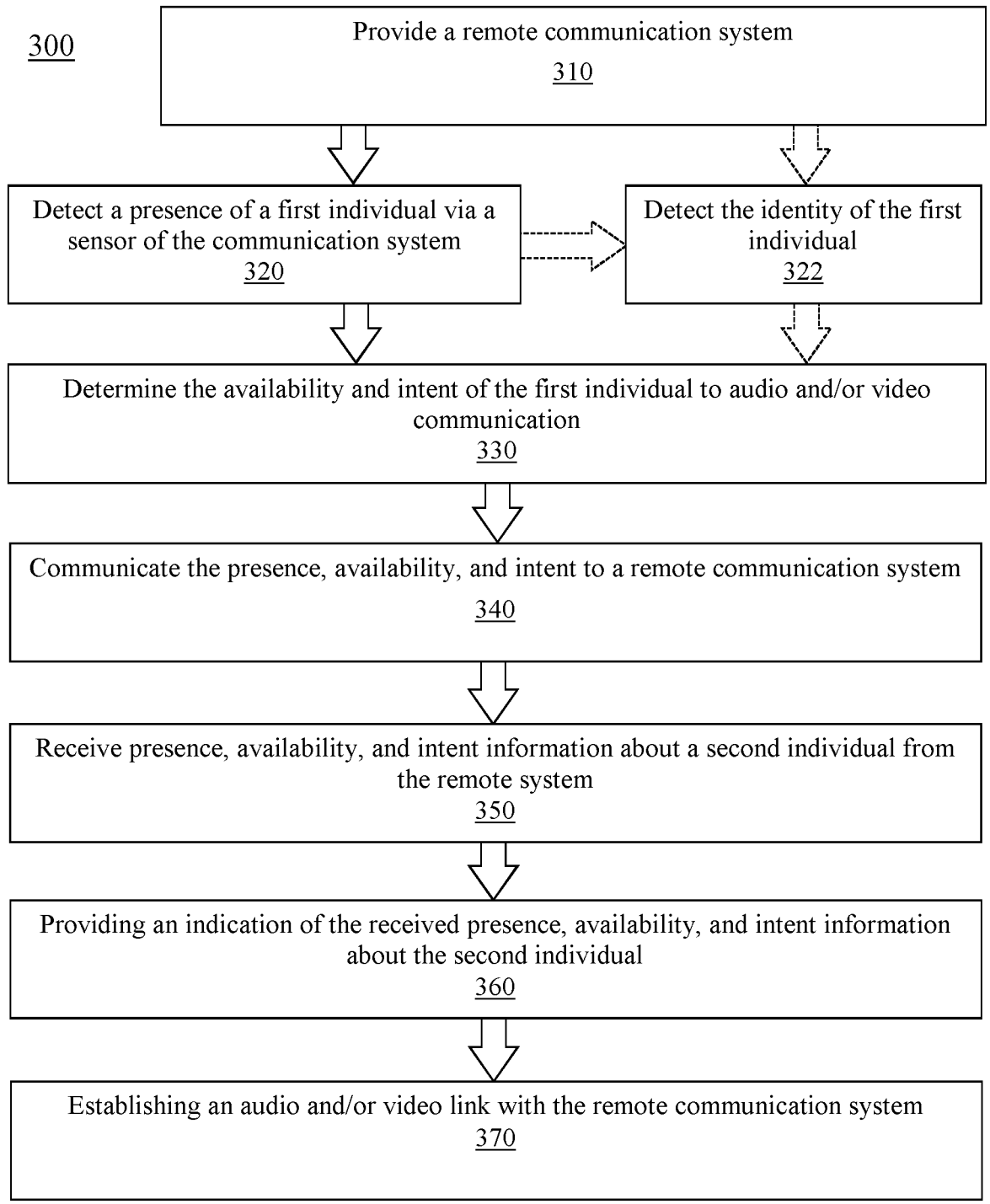
FIG. 3 is a flowchart illustrating an example process for establishing communication between communication devices in a communication system.

FIG. 3 is a flowchart of a method 300 for remote communication. At step 310 of the method, a communication device or system for remote communication is provided. The communication device or system can be any of the devices or systems described or otherwise envisioned herein, including communication device 100 and communication system 200.

At step 320 of the method, the communication device 100 detects the presence of a first individual 120. Sensor 110 of communication device 100 obtains sensor data and determines that an individual is present, or communicates the sensor data to a processor 130 of communication device 100 which determines from the sensor data that an individual is present. According to an embodiment, as individual 120 enters the vicinity of communication device 100, sensor 110 of communication device 100 obtains sensor data and the device detects the individual's presence. For example, sensor 110 may be a microphone that detects presence based on sound, a camera that detects presence based on image analysis, a motion sensor that detects presence based on motion, a transceiver that detects presence based on detection of a signal from a fob, biometric sensor, or other signal, or any other sensor configured or capable of detecting presence.

According to an embodiment, sensor 110 of communication device 100 obtains sensor data indicating the proximity of individual 120 to the communication device. For example, the sensor may be a microphone that picks up louder noise levels as the individual approaches the device. As another example, the sensor may be a camera that determines through image analysis that the individual is approaching the device.

At optional step 322 of the method, the sensor 110 and/or processor 130 is configured to determine the identity of the individual 120. The processor may utilize information from sensor 110 and/or one or more additional sensors to determine the identity of the individual. For example, the sensor may obtain sound information from the environment and analyze the sound to detect a particular voice. As another example, the sensor may obtain an image of the individual and the processor may analyze the image using facial-recognition technology or other recognition technology to determine the identity. As another example, the processor 130 may receive biometric data from the sensor 110 and compare the biometric data to a database or memory of stored biometric data to make the identification. As another example, the processor 130 may receive data from a fob, smartphone, computing device, or any other device, signal emitter, or other component associated with a specific individual, and may compare that data to a database or memory of stored data to make the identification. The processor may utilize one or more other informational sources to determine, estimate, or predict the identity of individual 120. For example, the processor may be programmed to recognize that only one individual can activate communication device 100, or the processor may have access to an individual or household calendar which provides an indication of which individual(s) is likely to be present near the device, among many other options.

At step 330 of the method, processor 130 of communication device 100 determines the intent of individual 120 to establish an audio and/or video communication with a remote individual using communication device 100. Among other methods, intent may be inferred from an individual's activity or from sensor data, intent may be determined from pre-determined user settings or individual information such as a calendar, intent may be based on information learned by the system over time by observing and analyzing individual actions, and/or intent may be determined directly by the individual via a gesture, command, button, or other indication.

According to an embodiment, intent may be based in whole or in part on the identity of the individual. Similarly, the identity of the individual may determine in whole or in part to which remote device the communication device 100 will communicate. For example, if a household consists of a couple, communication device 100 may determine which individual from the couple is present and may determine that communication is only preferred or allowed with individuals that the determined individual has authorized. Thus, the communication device will only communicate with the siblings or parents or other preauthorized contacts of the determined individual, and will not communicate presence or intent information to the other individual's family or preauthorized contacts.

At step 340 of the method, communication module 150 of device 100 communicates the detected presence, identity, and/or determined intent of individual 120 to a remote communication device via a communications network 210. Network 210 is any network configured to transmit information from one location to another location, and may be a wired and/or wireless communication network. The network may be an intranet that connects communication devices within a building, facility, campus, or other connected location, or may be an intranet or other communications network that connects one or more remote communication devices. According to an embodiment, the detected presence of an individual at communication device 100 may wake up or activate the remote communication device.

At step 350 of the method, communication device 100 receives presence, identity, and/or availability information about one or more remote individuals from one or more remote communication devices. According to an embodiment, the remote communication device is paired with communication device 100 or is otherwise authorized to communicate with the communication device 100. For example, is a remote individual is in the vicinity of the remote communication device, a sensor of the remote communication device obtains sensor data and the device detects the remote individual's presence. The remote communication device determines, from the sensor data or another source of information, the availability of the remote individual to audio and/or video communication. Pursuant to preauthorization, learned behavior, a direct indication by the remote individual, or other authorization, the remote communication device communicates the presence, identity, and/or availability information to communication device 100 via a communications network such as communications network 210.

At step 360 of the method, indicator 160 of communications device 100 provides an indication of the received presence, identity, and/or availability information about the one or more remote individuals from the one or more remote communication devices. The indicator is configured to provide a plurality of different presence, identity, availability, and/or intent states for an individual. For example, the indicator may provide one indication among many possible indications along a continuum or spectrum of possible indicators.

Indicator 160 may be or comprise any indication sufficient to communicate the indicating information to an individual. For example, indicator 160 may be a speaker, a visual display, a vibrating mechanism, a color display, or any other type of indicator. As one example, indicator 160 may be a speaker that emits a noise or plays sounds communicated from a connected remote communication device. As another example, indicator 160 may be a LED or other light display that emits light of varying colors and/or intensity to indicate different states along a continuum or spectrum of possible states. A light display 160 of communication device 100 can be configured to emit a light of a first color to indicate the presence of an individual at a remote communication device, and can either increase the intensity of the first light or transform to a second color as the individual at the remote communication device gets closer to the device, and/or as the remote communication device determines that the individual is available for communication. Rather than a binary indication of active communication or no communication, a light display 160 of communication device 100 is configured or programmed to indicate a plurality of presence, identity, availability, and/or intent states for an individual located at a connected communication device.

According to an embodiment, indicator 160 of communication device 100 comprises a plurality of indicators each configured to indicate at least one of an individual's presence, availability, and/or intent. For example, a first indicator 160a can be configured to indicate an individual's presence near a communication device, and a second indicator 160b can be configured to indicate the individual's availability and/or intent for video and/or audio communication. First indicator 160a and second indicator 160b may comprise the same indication method, or may comprise different indication methods. For example, first indicator 160a may utilize noise to convey presence, and second indicator 160b may utilize light to convey intent or availability.

At step 370 of the method, audio and/or video communication is established between communication device 100 and the remote communication device. The audio and/or video communication link can comprise any link along a continuum or spectrum of possible communication links, and can be a high-fidelity or low-fidelity communication link. For example, receipt of presence and availability or intent information by a communication device can be accepted as tacit permission to establish a greater depth of communication between the devices, including up to direct person-to-person audio and/or visual communication. As just one example, if individual 120 is present and has the requisite intent for communication, and the remote individual is present and is determined to be available for communication, each device receives the necessary information and interprets or analyzes the information to enable additional communication. For example, one or more of the devices may now be enabled for direct voice or video communication without requiring any additional activation or permissions from either individual.

According to an embodiment, low-fidelity communication information may be transmitted between communication devices. Low-fidelity communicated information may be, for example, ambient sounds collected by a device and sent to the other device indicating an individual's presence, without direct person-to-person communication. These ambient sounds may be communicated just as they are collected by sensor 110 of a device, or may be modified prior to communication. Low-fidelity communication may be based on one or more user settings or learned settings. An individual may switch between low-fidelity communication and high-fidelity communication using a gesture, a button, a command, or any other indication or activation mechanism.

According to an embodiment, the communication device may be configured to automatically request or establish an audio and/or video communication link with the remote device in response to the individual's presence, proximity to a communication device, and/or determined intent. The communication device may also or alternatively be configured to automatically request or establish an audio and/or video communication link with the remote device in response to the remote individual's presence, proximity to a communication device, and/or determined availability. This information may be inferred or based on learned behaviors. For example, communication device 100 may detect activity or presence of a remote individual through sound such as a television show in the background. If the individual at device 100 and the remote individual are engaging in similar activities such as watching the same television show, then the system may infer that the individuals have the requisite intent and availability, and may automatically establish a communications link between the devices.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A device configured for remote communication, the device comprising:
   a sensor configured to detect a presence of a first individual;
   a processor configured to determine an intent of the first individual to establish audio and/or video communication with a remote individual, wherein the intent of the first individual to communicate with the remote individual is determined based at least in part on a rules-based sequence and/or ordering of information relating to the first individual;
   a communication module configured to communicate, to a remote device, the detected presence and determined intent of the first individual, and further configured to receive, from the remote device, an indication of a presence of the remote individual at the remote device, and further configured to receive availability of the remote individual to audio and/or video communication; and
   an indicator configured to indicate, at the first device, the detection of the remote individual's presence and availability to audio and/or video communication, wherein the indicator is configured to indicate a plurality of different presence and availability states for the remote individual and wherein the indicator is arranged to increase or decrease an intensity of the indicator as the remote individual moves closer to or farther away from the remote device.

2. The device of claim 1, wherein the sensor is further configured to detect a proximity of the first individual to the sensor, and wherein the communication module is further configured to communicate the detected proximity.

3. The device of claim 1, wherein the sensor is a microphone, a biometric sensor, a camera, a wearable device, a motion detector, or a wireless signal sensor.

4. The device of claim 1, wherein the indicator is a speaker or visual display.

5. The device of claim 1, wherein the indicator is configured to indicate each of the plurality of different presence and availability states for the remote individual differently.

6. The device of claim 1, further comprising a video display.

7. The device of claim 1, wherein the indicator is configured to communicate sound from the remote device as the indication of the detection of the remote individual's presence.

8. The device of claim 1, wherein the device is configured to automatically establish, in response to the detection of the remote individual's presence, an audio and/or video communication link with the remote device.

9. The device of claim 1, wherein the device is configured to automatically establish, in response to the detection of the remote individual's availability to audio and/or video communication, an audio and/or video communication link with the remote device.

10. The device of claim 1, wherein the sensor is further configured to detect an identity of the first individual, and wherein the communication module is further configured to communicate the detected identity.

11. The device of claim 10, wherein the device is configured to automatically establish, in response to the detection of the first individual's identity, an audio and/or video communication link with the remote device.

12. The device of claim 1, wherein the sensor is further configured to obtain sound information upon detection of the presence of the first individual, and wherein the sound information is utilized to communicate the detected presence and/or determined intent of the first individual to the remote device.

13. The device of claim 12, wherein the processor is further configured to analyze the sound information to remove unwanted sound.

14. The device of claim 12, wherein the device is configured to automatically establish, in response to certain sound information, an audio and/or video communication link with the remote device.

15. A system configured for remote communication, the system comprising:
   a first communication device comprising:
      a sensor configured to detect a presence of a first individual;
      a processor configured to determine an intent of the first individual to establish audio and/or video communication with a remote individual, wherein the intent of the first individual to communicate with the remote individual is determined based at least in part on a rules-based sequence and/or ordering of information relating to the first individual;

a communication module configured to communicate the detected presence and determined intent of the first individual, and further configured to receive an indication of a presence of the remote individual and availability of the remote individual to audio and/or video communication; and an indicator configured to indicate the detection of the remote individual's presence and availability to audio and/or video communication, wherein the indicator is configured to indicate a plurality of different presence and availability states for the remote individual and wherein the indicator is arranged to increase or decrease an intensity of the indicator as the remote individual moves closer to or farther away from the remote device; and a second communication device in communication with the first communication device, the second communication device comprising:

a sensor configured to detect a presence of the remote individual;

a processor configured to determine availability of the first individual to establish audio and/or video communication with a remote individual;

a communication module configured receive an indication of a presence of the first individual and intent of the first individual for audio and/or video communication, and further configured to communicate the detected presence and determined availability of the remote individual; and an indicator configured to indicate the detection of the first individual's presence and intent for audio and/or video communication, wherein the indicator is configured to indicate a plurality of different presence and availability states for the first individual.

16. The system of claim 15, wherein the first and/or second indicators are configured to indicate each of the plurality of different presence, intent, and/or availability states for the remote individual differently.

17. A method for remote communication, the method comprising the steps of:

detecting, with a sensor of a first system, a presence of a first individual;

determining, by a processor of the first system, an intent of the first individual to establish audio and/or video communication with a remote individual, wherein the intent of the first individual to communicate with the remote individual is determined based at least in part on a rules-based sequence and/or ordering of information relating to the first individual;

communicating to a remote system, by a communication module of the first system, the detected presence and determined intent of the first individual;

receiving, from the remote system, an indication of a presence of the remote individual at the remote system, and availability of the remote individual to audio and/or video communication; and providing, by an indicator of the first system, the detection of the remote individual's presence and availability to audio and/or video communication, wherein the indicator is configured to indicate a plurality of different presence and availability states for the remote individual and wherein the indicator is arranged to increase or decrease an intensity of the indicator as the remote individual moves closer to or farther away from the remote device.

18. The method of claim 17, wherein the sensor is further configured to detect an identity of the first individual.

19. The method of claim 17, wherein the indicator is configured to indicate each of the plurality of different presence and availability states for the remote individual differently.

20. The method of claim 17, wherein the sensor is further configured to obtain sound information upon detection of the presence of the first individual, and wherein the sound information is utilized to communicate the detected presence and/or determined intent of the first individual to the remote system.

21. A device configured for remote communication, the device comprising:

a sensor configured to detect a presence of a first individual;

a processor configured to determine an intent of the first individual to establish audio and/or video communication with a remote individual, wherein the intent of the first individual to communicate with the remote individual is determined based at least in part on a rules-based sequence and/or ordering of information relating to the first individual;

a communication module configured to communicate, to a remote device, the detected presence and determined intent of the first individual, and further configured to receive, from the remote device, an indication of a presence of the remote individual at the remote device, and further configured to receive availability of the remote individual to audio and/or video communication; and an indicator configured to indicate, at the first device, the detection of the remote individual's presence and availability to audio and/or video communication, wherein the indicator is configured to indicate a plurality of different presence and availability states for the remote individual wherein at least one presence and availability state of the plurality of different presence and availability states includes producing a low-fidelity audio output.

22. The device of claim 21, wherein the sensor is a microphone, a biometric sensor, a camera, a wearable device, a motion detector, or a wireless signal sensor.

23. The device of claim 21, wherein the indicator is configured to indicate each of the plurality of different presence and availability states for the remote individual differently.

24. The device of claim 21, wherein the sensor is further configured to detect an identity of the first individual, and wherein the communication module is further configured to communicate the detected identity.

25. The device of claim 24, wherein the device is configured to automatically establish, in response to the detection of the first individual's identity, an audio and/or video communication link with the remote device.

* * * * *